US006638600B2

(12) United States Patent
Gazo et al.

(10) Patent No.: US 6,638,600 B2
(45) Date of Patent: Oct. 28, 2003

(54) CERAMIC SUBSTRATE FOR NONSTICK COATING

(75) Inventors: Louis J. Gazo, Independence, OH (US); Srinivasan Sridharan, Strongsville, OH (US)

(73) Assignee: Ferro Corporation, Cleveland, OH (US)

( * ) Notice: Subject to any disclaimer, the term of this patent is extended or adjusted under 35 U.S.C. 154(b) by 33 days.

(21) Appl. No.: 09/953,063

(22) Filed: Sep. 14, 2001

(65) Prior Publication Data

US 2003/0059600 A1 Mar. 27, 2003

(51) Int. Cl.[7] ........................ B32B 15/04; B32B 15/08; B32B 15/20; B32B 18/00

(52) U.S. Cl. .................... 428/141; 428/411.1; 428/419; 428/421; 428/469; 428/471; 428/472; 428/473.5

(58) Field of Search ............................ 428/141, 411.1, 428/419, 421, 422, 469, 471, 472, 473.5; 99/324

(56) References Cited

U.S. PATENT DOCUMENTS

| | | | | |
|---|---|---|---|---|
| 3,372,053 A | | 3/1968 | McCarthy | 117/70 |
| 3,393,086 A | | 7/1968 | Keating | 117/70 |
| 3,788,513 A | | 1/1974 | Racz | 220/64 |
| 3,837,895 A | | 9/1974 | Pryor et al. | 117/70 A |
| 3,983,275 A | | 9/1976 | Winter et al. | 428/35 |
| 4,204,021 A | | 5/1980 | Becker | 428/325 |
| 4,250,215 A | | 2/1981 | Mayer | 428/35 |
| 4,311,755 A | | 1/1982 | Rummel | 428/312.6 |
| 4,591,530 A | | 5/1986 | Lui | 428/325 |
| 4,623,565 A | | 11/1986 | Huybrechts et al. | 428/35 |
| 4,862,609 A | | 9/1989 | Ullrich et al. | 38/93 |
| 5,037,675 A | | 8/1991 | Kishi et al. | 427/258 |
| 5,071,695 A | | 12/1991 | Tannenbaum | 428/216 |
| 5,079,073 A | | 1/1992 | Tannenbaum | 428/216 |
| 5,168,013 A | * | 12/1992 | Tannenbaum | 428/422 |
| 5,250,356 A | | 10/1993 | Batzar | 428/421 |
| 5,455,102 A | | 10/1995 | Tsai | 428/141 |
| 5,560,978 A | | 10/1996 | Leech | 428/141 |
| 5,628,426 A | | 5/1997 | Doyle et al. | 220/608 |
| 5,667,891 A | | 9/1997 | Batzar et al. | 428/389 |
| 5,726,247 A | | 3/1998 | Michalczyk et al. | 525/102 |

FOREIGN PATENT DOCUMENTS

WO 0056537 9/2000

OTHER PUBLICATIONS

Ferro Corporation, Technical Information Bulletin, Processing and Use of Ferro Aluminum Enamels, Aug. 1, 1968, "Porcelain Enamel Substrate For Non–Stick Finishes," pp. 1–5.

19th International Enamellers' Congress, May 21, 2001, Leveaux et al. "Bonding of Vitreous Enamels Onto Aluminum Alloys: the Horizon Extends," pp. 77–88.

* cited by examiner

*Primary Examiner*—Ramsey Zacharia
(74) *Attorney, Agent, or Firm*—Rankin, Hill, Porter & Clark LLP

(57) ABSTRACT

The present invention provides a new and useful nonstick coating for use on pure aluminum, alloys of aluminum, or aluminized steel surfaces. A nonstick coating according to the present invention includes a ceramic substrate disposed on an aluminum surface and a fluorocarbon polymer coating disposed on the ceramic substrate. The ceramic substrate, prior to firing, includes at least two layers: a first or bottom layer applied to the aluminum surface including an enamel ground coat; and a second or top layer applied over the enamel ground coat layer including a blend of one or more glass frits, non-ceramic refractory particles, and non-vitreous inorganic oxide particles. Upon firing, the ceramic substrate includes a continuous layer of vitreous enamel that is bonded to the aluminum surface. The exposed surface of the ceramic substrate has a micro-rough texture that is enriched with bonding sides for binder resins used in a fluorocarbon polymer primer layer. The ceramic substrate protects the aluminum surface from corrosion and mechanical damage and also protects the fluorocarbon polymer coating from abrasive wear.

15 Claims, No Drawings

CERAMIC SUBSTRATE FOR NONSTICK COATING

FIELD OF INVENTION

The present invention relates to a nonstick coating for application to an aluminum surface. More particularly, the present invention relates to a nonstick coating that is formed by applying a ceramic substrate to an aluminum surface and applying a fluorocarbon polymer coating to the ceramic substrate.

BACKGROUND OF THE INVENTION

Fluorocarbon polymers, such as polytetrafluoroethylene (PTFE), polymers of chlorotrifluoroethylene (CTFE), fluorinated ethylene-propylene polymers (FEP), polyvinylidene fluoride (PVF), combinations thereof and the like, are known to have superior nonstick properties. For this reason, they have been used in a wide variety of applications, including forming nonstick coatings on articles of cookware. However, due to the inherent nonstick nature of these fluorocarbon polymers, it has been difficult to form nonstick coatings that adhere well to substrates such as pure aluminum, alloys of aluminum, and aluminized steel. Moreover, due to the inherent softness of fluorocarbon polymers, it has been difficult to form nonstick coatings that resist abrasion.

In an effort to overcome these difficulties, it has been the conventional practice to apply one or more base coats containing adhesive resins in order to better adhere fluorocarbon polymer top coats to substrates (throughout this specification and in the claims, the terms "bases coat" and "primer coat" are used interchangeably). In general, such base coats comprise a combination of high temperature binder resins, such as polyamideimide resins (PAI), polyethersulfone resins (PES) or polyphenylene sulfide resins (PPS), and fluorocarbon polymer resins. The performance of these conventional nonstick coating systems is based upon a stratification of the applied coatings. This stratification results in a coating that is rich in high temperature binder on the bottom and rich in fluorocarbon polymer at the top. The binder-rich bottom provides adhesion to the substrate while the fluorocarbon polymer-rich top provides a layer to which subsequent fluorocarbon polymer top coats can be fused by sintering at high temperature.

The performance of such nonstick coating systems is at best a compromise. The bottom layer of the base coats is not a purely binder resin. Considerable levels of fluorocarbon polymer resins must be included in the base coats in order to provide a layer that is sufficiently rich in fluorocarbon polymer to promote good bonding of subsequent fluorocarbon polymer top coats to the base coat. The presence of fluorocarbon polymer resins in the base coat are disadvantageous because they detract from the adhesion of the base coat to the substrate. Therefore, it has been necessary to roughen substrates by mechanical (e.g. grit blasting) or chemical (e.g. etching) means to assist holding the base coat to the substrate.

Moreover, because both the adhesive resins and fluorocarbon polymers are relatively soft, there have been difficulties in making these nonstick coatings resistant to abrasive wear. Efforts to overcome these deficiencies have included the addition of mica particles, ceramic fillers, or metal flakes to the intermediate and top coat in order to increase the hardness. The presence of these fillers can be disadvantageous. For example, incorporation of metal flakes in the applied coatings can actually promote chemical corrosion of the underlying metal substrate due to dissimilarity between the metals. Moreover, these particulate fillers cannot be incorporated into the nonstick coating at high levels because at high levels they diminish the nonstick properties of the coating and the bonding to the substrate.

Due to the limitations thus described, articles of cookware coated with conventional fluorocarbon polymer nonstick coating systems are prone to damage and abrasive wear during normal use. Cooking utensils, for example, often cause cuts, slices, or gouges in the nonstick coating which permit acids or alkaline foodstuffs and cleaning agents to penetrate to the exposed aluminum substrate and cause corrosion. Corrosion of the underlying aluminum by these materials can further weaken the adhesion of the nonstick coating adjacent to the cut or slice. Moreover, abrasive forces routinely encountered in cooking and cleaning cause the gradual removal of the soft fluorocarbon polymer top coat resulting in diminished nonstick properties. Conventional nonstick coatings simply do not adequately protect the aluminum substrate from corrosion or the fluorocarbon polymer top coat from routine abrasive wear.

SUMMARY OF INVENTION

The present invention provides a new and useful nonstick coating for use on an aluminum surface, a methods of forming such a nonstick coating, and articles of cookware having such a nonstick coating applied thereto. A nonstick coating according to the present invention comprises a ceramic substrate disposed on an aluminum surface and a fluorocarbon polymer coating disposed on said ceramic substrate. The ceramic substrate, prior to firing, comprises at least two layers: a first or bottom layer that is applied to the aluminum surface comprising an enamel ground coat; and a second or top layer applied over the enamel ground coat comprising a blend of one or more glass frits, non-ceramic refractory particles, and non-vitreous inorganic oxide particles. Upon firing, the portion of the ceramic substrate in contact with the aluminum surface comprises a continuous layer of vitreous enamel that is bonded to the aluminum surface, and the exposed surface of the ceramic substrate exhibits a micro-rough texture that is enriched with bonding sides for binder resins in a fluorocarbon polymer primer layer. The ceramic substrate protects the aluminum surface from corrosion and mechanical damage and also protects the fluorocarbon polymer coating from abrasive wear.

A nonstick coating according to the present invention can be applied to an aluminum surface that has been cleaned only. It is not necessary to grit blast or acid etch the aluminum surface in order to attain satisfactory adhesion of the coating. Moreover, a nonstick coating according to the present invention is substantially more durable than conventional nonstick coatings. A nonstick coatings according to the invention is particularly well-suited for use in food preparation applications, but can be used in any application where a durable nonstick coating is desired.

A nonstick coating according to the present invention is formed by applying a ceramic substrate to an aluminum surface and then applying a fluorocarbon polymer coating to the ceramic substrate. In a preferred embodiment, the ceramic substrate is formed by spraying a first layer comprising an enamel ground coat onto the aluminum surface, flash drying the first layer, applying a second layer comprising a blend of one or more glass frits, non-ceramic refractory particles, and non-vitreous inorganic oxide particles, and then firing the applied first and second layers to form a ceramic substrate comprising a continuous layer of vitreous enamel that is bonded to the aluminum surface that has an exposed surface having a micro-rough texture that is enriched with bonding sides for the binder resins in a fluorocarbon polymer primer layer. Next, a fluorocarbon polymer primer layer and one or more fluorocarbon polymer top coats are successively applied to the ceramic substrate by spraying and then sintered to form the nonstick coating.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a nonstick coating for use on an aluminum surface. Throughout the specification and in the appended claims, the term "aluminum surface" is intended to mean any metallic surface that bears a substantial amount of aluminum including, for example, surfaces comprising pure aluminum, alloys of aluminum, and aluminized steel. The nonstick coating according to the invention is particularly suitable for use in the food industry on cookware and on electrical appliances used in the preparation of food. However, the nonstick coating according to the present invention is also suitable for use in other applications where durable nonstick surfaces are needed, such as on steam irons and in industrial applications.

A nonstick coating according to the present invention is formed by applying a ceramic substrate to an aluminum surface and then applying a fluorocarbon polymer coating to the ceramic substrate. The ceramic substrate, prior to firing, comprises at least two layers: a first or bottom layer applied to the aluminum surface comprising an enamel ground coat; and a second or top layer applied over the enamel ground coat layer comprising a blend of one or more glass frits, non-ceramic refractory particles, and non-vitreous inorganic oxide particles. Each of the layers comprising the nonstick coating according to the invention are discussed in greater detail below:

Aluminum Surface

As noted above, the aluminum surface can comprise pure aluminum, alloys of aluminum, or aluminized steel. The aluminum surface need not be roughened prior to application of the ceramic substrate such as by grit blasting and etching, although such roughening could be done if desired, and would probably marginally improve the adhesion of the ceramic substrate. In the preferred embodiment of the invention, the aluminum surface is cleaned-only, such as with alkali detergents, prior to application of the ceramic substrate. The aluminum surface can be the interior surface of a cooking vessel, the bottom of a steam iron, or any other structure where a durable nonstick surface is desired.

Ceramic Substrate—First Layer

The first layer of the ceramic substrate comprises an enamel ground coat layer. The first layer is applied to the aluminum surface and then the second layer of the ceramic substrate is applied over the first layer. Thus, the first layer of the ceramic substrate is disposed between the aluminum surface and the second layer of the ceramic substrate.

The first layer of the ceramic substrate comprises an adhesion promoting enamel ground coat that comprising one or more glass frits comprising one or more smelted-in bond-promoting oxides. The preferred smelted-in bond-promoting oxide for use in the invention is cobalt oxide, which improves the adhesion of the ceramic substrate to the aluminum surface. Alternative bond-promoting oxides include nickel oxide, copper oxide and iron oxide, which can be used alone or in combination with each other and/or cobalt oxide.

A cobalt oxide containing glass frit for use in forming an enamel ground coat suitable for use in the invention preferably has the following compositional range (in weight percent):

| Constituent | Range | Preferred Range |
|---|---|---|
| $SiO_2$ | 20–50 | 20–50 |
| $Na_2O$ | 5–30 | 10–30 |
| $TiO_2$ | 5–30 | 5–30 |
| $K_2O$ | 0–15 | 1–15 |
| $V_2O_5$ | 0–15 | 0–15 |
| $M_xO_y$* | 1–5 | 2–5 |
| $Li_2O$ | 0–5 | 1–5 |
| $P_2O_5$ | 0–5 | 0–5 |
| $B_2O_3$ | 0–5 | 0–5 |

*Where M preferably comprises cobalt, but alternatively comprises nickel, copper and/or iron.

The first layer is preferably applied as a slip using a conventional wet enamel spray technique. To facilitate spraying, the specific gravity of the slip is preferably adjusted to about 1.68 g/cc. However, it will be appreciated that the first layer can be applied by other conventional enameling techniques, which are well known. When applied as a wet slip by spraying, the first layer is preferably "flash dried" or air dried until no surface moisture is present before the second layer is applied, although such drying is not per se necessary.

Ceramic Substrate—Second Layer

The second layer of the ceramic substrate comprises a blend of one or more glass frits, non-ceramic refractory particles, and non-vitreous inorganic oxide particles. The second layer is also preferably applied as a wet slip by spraying. The slip can be formed by ball milling one or more glass frits together with the non-vitreous inorganic oxide particles and any optional vehicles, mill additives, and fillers to form a slip. The non-ceramic refractory particles in the second layer are preferably added to the slip using a high speed mixer after the other components have been milled so as to avoid damaging the milling equipment.

Common mill additions and fillers in the second layer include, but are not limited to, boric acid, potassium hydroxide, sodium hydroxide, sodium silicate, potassium nitrate, potassium carbonate, potassium silicate, quartz, colloidal silica, ceramic fillers, and pigments. As is well known in the art, there is a wide range of other acceptable mill agents or components that may also be utilized in the present invention to produce the desired resultant product. Preferably, optional mill additions and fillers will comprise from about 0% to about 50% by weight of the solids portion of the slip.

Typically, the slip used to form the second layer of the ceramic substrate is milled to a fineness of about 0.3 to about 0.5 grams residue being retained on a 325 mesh sieve from a 50 cubic centimeter sample. Milling can be accomplished by wet or dry techniques. It will be appreciated that milling fineness is not critical, and can be altered without significant impact on the final coating. The non-ceramic refractory particles can be milled together with the glass frits, non-vitreous inorganic oxide particles, and optional mill additions, but are usually mixed with such components after milling to avoid damaging the milling equipment. Mixing of the non-ceramic refractory particles into the slip can be accomplished using a high-speed mixer or a blender.

The composition of the glass frit or frits used in the preparation of the slip is not per se critical, and any one or more of a number of conventional glass frits for use on aluminum or aluminized steel is suitable for use in the invention. The glass frit or frits may be prepared utilizing conventional glass melting techniques. A conventional ceramic refractory, fused silica, or platinum crucible may be used to prepare the glass frit. Typically, selected oxides are smelted at temperatures of from about 1200° C. to about 1400° C. for 30 minutes. The molten glass formed in the crucible is then converted to glass frit using water-cooled steel rollers or water quenching. It will be appreciated that the step of producing the glass frit is not per se critical and any of the various techniques well-known to those skilled in the art can be employed.

As noted above, the composition of the glass frits is not critical, and a variety of glass frits suitable for use on aluminum and aluminzed steel can be used in the application. For example, the same glass frit as used in the first layer can be used in the second layer. Typically, the second layer includes one or more glass frits having the following compositional range (by weight percent):

| Constituent | Range |
|---|---|
| $SiO_2$ | 30–45 |
| $TiO_2$ | 12–30 |
| Alkali Metal Oxides | 5–35 |
| $Bi_2O_3$ | 0–20 |
| $B_2O_3$ | 0–15 |
| Alkaline-Earth Metal Oxides | 0–10 |
| $V_2O_5$ | 0–10 |
| $Sb_2O_5$ | 0–5 |
| $SnO_2$ | 0–5 |

Throughout the specification and in the appended claims, the term "non-vitreous inorganic oxide particles" refers to particles of materials that do contain substantial amounts of silicates and/or other oxides but are not glassy (i.e., the particles are not amorphous). The non-vitreous inorganic oxide particles used in the second layer of the ceramic substrate are preferably selected from alumina, $SiO_2$ (e.g., quartz), zirconia, feldspar, and/or wollastonite. The non-vitreous inorganic oxide particles preferably have a particle size of from about 25 $\mu$m to about 75 $\mu$m, with an average particle size of about 40 $\mu$m being presently most preferred (e.g., about 325 to about 400 mesh particles).

The non-vitreous inorganic oxide particles in the second layer of the ceramic substrate provide a surface that is enriched with bonding sites for the binder resins in the fluorocarbon polymer primer layer. The non-vitreous inorganic oxide particles also enhance the durability of the ceramic substrate in terms of its mechanical abrasion resistance and chemical resistance.

Throughout the specification and in the appended claims the term "non-ceramic refractory particles" refers to particles of materials that do not contain substantial amounts of silicates and/or other oxides but are nevertheless able to withstand high temperatures. Non-ceramic refractory particles suitable for use in the invention include diamond, carbides, borides, and nitrides. The preferred non-ceramic refractory particles include one or more selected from the group consisting of diamond, boron nitride, boron carbide, titanium boride, aluminum boride, silicon carbide, titanium carbide, silicon nitride, and zirconium boride. Silicon carbide is the presently most preferred non-ceramic refractory particles particle for use in the invention.

Preferably, the non-ceramic refractory particles used in the invention have an average particle size within the range of from about 20 $\mu$m to about 40 $\mu$m, and more preferably about 33 $\mu$m (e.g., about 400 to about 600 mesh particles). The non-ceramic refractory particles comprise from about 1% by weight to about 20% by weight of the solids portion of the slip.

Although the mechanism is not fully understood at this time, the non-ceramic refractory particles cause the exposed surface of the ceramic substrate to be micro-rough subsequent to firing. When viewed under magnification, the exposed surface of the fired ceramic substrate appears to be a network of jagged peaks and valleys. In this respect, the surface of the ceramic substrate appears similar to the surface of an aluminum surface that has been grit blasted.

After the non-ceramic refractory particles are mixed into the slip, the slip is applied over the first layer of the ceramic substrate using any of the conventional wet application processes, such as spraying, dipping, and flow coating, which are well-known. Spray application is preferred. For spray applications, it is preferable to adjust the specific gravity of the slip to about 1.64 g/cc. The second layer of the ceramic substrate is preferably dried prior to firing, although drying is not a necessary step.

Firing is typically conducted in an air convection furnace at a temperature from about 1,000° F. to about 1,100° F. for a period of about 5 minutes to about 18 minutes. Of course, the exact firing temperatures and duration will be determined based upon the thickness of the aluminum surface, with thick surfaces requiring longer firing times. Moreover, it will be appreciated that the maximum allowable firing time and temperature will be also be limited by the melting temperature of the aluminum surface. Care must be taken to avoid melting the aluminum surface during firing. Thus, longer or shorter firing periods can be used depending on the thickness of the applied ceramic substrate and the thickness of the article being coated.

After firing, the ceramic substrate will preferably have a thickness of from about 1.0 mil to about 4.0 mils, and more preferably of about 1.5 mils. It will be appreciated that the application rate of the coating composition can be varied to produce thinner or thicker ceramic substrates, and that application rate and thickness is not critical and can be altered without significant impact on the nonstick coating.

After firing, it is impossible to separate and/or distinguish the first layer of the ceramic substrate from the second layer of the ceramic substrate, as there is significant diffusion between the two layers. When viewed in cross-section, the fired ceramic substrate exhibits a substantially continuous vitreous region adjacent to the aluminum surface that is well bonded to the aluminum surface. The exposed surface of the ceramic substrate exhibits a micro-rough surface that is similar in terms of its roughness to the texture of 800 grit sandpaper. It will be appreciated that by varying the average diameter and/or weight percent of the non-ceramic refractory particles in the second layer, ceramic substrates with varying degrees of surface roughness can be produced.

The roughness of a surface can be expressed in terms of average surface roughness (Ra), which is the arithmetic average of the absolute deviations of the roughness profile from the roughness center line. The average surface roughness (Ra) of a ceramic substrate formed according to the present invention is preferably within the range of from about 0.5 $\mu$in to about 5.0 $\mu$in, with about 2.75 $\mu$in being typical. By comparison, the average roughness (Ra) of a conventional enamel for use on aluminum is typically less than about 0.032 $\mu$in. All surface roughness measurements reported in this specification and claimed in the appended claims were made using an M4Pi-Rk® surface analyzing instrument available from Mahr GmbH. and profileView® surface analyzing software available from Metrex, a division of Extrude Hone of Irwin, Pa.

Fluorocarbon Polymer Coating

A conventional fluorocarbon polymer coating is applied to the ceramic substrate and sintered to form the nonstick coating. Throughout the specification and in the claims, the term fluorocarbon polymer coating refers to a coating that is formed using conventional fluorocarbon polymers such as polytetrafluoroethylene (PTFE), polymers of chlorotrifluoroethylene (CTFE), fluorinated ethylene-propylene polymers (FEP), polyvinylidene fluoride (PVF), combinations thereof and the like. The composition of the fluorocarbon polymer coating is not critical, and a variety of fluorocarbon polymer compositions conventionally used in the formation of a nonstick coating can be employed in the invention.

The fluorocarbon polymer coating preferably comprises a primer layer and one or more fluorocarbon polymer top coats. The primer layer comprises a blend of fluorocarbon polymers and one or more adhesion promoting high temperature binder resins, such as polyamideimide resins (PAI), polyethersulfone resins (PES) and polyphenylene sulfide resins (PPS). The primer layer is applied directly onto the exposed surface of the ceramic substrate. The non-vitreous inorganic oxide particles in the second layer of the ceramic substrate enrich the surface of the ceramic substrate with bonding sites for the binder resins in the primer, thus improving the adhesion of the applied fluorocarbon polymer coating to the ceramic substrate. The additional surface area and micro-rough texture of the exposed surface of the ceramic substrate also provide a mechanical advantage in terms of improving adhesion of the fluorocarbon polymer coating to the ceramic substrate and protecting it from abrasive wear and damage.

After the primer layer is applied, one or more fluorocarbon polymer top coats are typically applied by conventional wet or dry techniques and then the entire fluorocarbon polymer coating is sintered. It will be appreciated that the fluorocarbon polymer top coat can be applied in several layers or in a single layer. After sintering, the fluorocarbon polymer coating preferably has a thickness of from about 0.25 mils to about 2 mils, and more preferably of about 0.5 mils.

Sintering temperatures and times will vary depending upon the composition and the thickness of the fluorocarbon polymer coating. By way of example, PTFE applied to a thickness of about 25–50 $\mu$m can be sintered in a convection oven heated to a temperature of at about 810° F. in about 10 minutes.

Preferred Method of Forming a Nonstick Coating

According to the preferred method of the present invention, a nonstick coating is formed on an aluminum surface by the steps comprising: providing an aluminum surface; cleaning the aluminum surface using an alkali detergent; applying a first layer of a ceramic substrate comprising an enamel ground coat in the form of a wet slip by spraying; flash drying the first layer; applying a second layer of a ceramic substrate comprising a blend of one or more glass frits, non-ceramic refractory particles, and non-vitreous inorganic oxide particles in the form of a wet slip by spraying; firing the applied first and second layers to form a ceramic substrate comprising a continuous layer of vitreous enamel that is bonded to the aluminum surface, said ceramic substrate having an exposed surface having a micro-rough texture that is enriched with bonding sides for binder resins used in fluorocarbon polymer primer layers; applying a fluorocarbon polymer primer layer to said ceramic substrate; applying at least one fluorocarbon polymer top coat to said fluorocarbon polymer primer layer; and sintering the applied fluorocarbon polymer layers.

EXAMPLE 1

Glass Frit A was prepared using conventional glass melting techniques having the following oxide composition:

| Constituent | Weight Percent |
|---|---|
| $SiO_2$ | 33.87 |
| $Na_2O$ | 20.44 |
| $TiO_2$ | 20.38 |
| $V_2O_5$ | 9.33 |
| $K_2O$ | 7.58 |
| $Co_2O_3$ | 3.13 |
| $P_2O_5$ | 2.82 |
| $Li_2O$ | 2.11 |
| $B_2O_3$ | 0.24 |

Glass Frit A was ball milled together with the following mill additions in the amounts shown below to form a slip:

| Component | Grams |
|---|---|
| Glass Frit A | 100 |
| $H_3BO_3$ | 4 |
| KOH | 2.5 |
| Sodium Silicate | 2.5 |
| F 6340 Black Oxide Pigment* | 10 |
| Water | 50 |

*Available from Ferro Corporation of Cleveland, Ohio.

The slip was milled to a fineness of 0.1 to 0.3 grams being retained on a 325 mesh sieve from a 50 cubic centimeter sample. The slip, which had a specific gravity of about 1.68 g/cc, was then applied to the inner surface of a cookware blank (9" diameter skillet) formed from a ⅛th inch thick sheet of 3003 aluminum alloy that had been cleaned only. The application rate of the slip was about 155 to about 200 g/m$^2$ to produce a coating having a thickness of about 1.2 mils. The enamel ground coat layer was allowed to partially air dry until no surface moisture was present.

EXAMPLE 2

Glass Frit B was prepared using conventional glass melting techniques to produce a frit having the following oxide composition:

| Constituent | Weight Percent |
|---|---|
| $SiO_2$ | 39.7 |
| $TiO_2$ | 23.0 |

-continued

| Constituent | Weight Percent |
|---|---|
| $K_2O$ | 16.1 |
| $Na_2O$ | 10.8 |
| $Li_2O$ | 4.8 |
| $B_2O_3$ | 3.2 |
| CaO | 2.6 |

Glass Frit B was ball milled together with the following mill additions in the amounts shown below to form a slip:

| Component | Grams |
|---|---|
| Glass Frit B | 50 |
| Fumed Silica (Aerosil) | 1 |
| KOH | 2.5 |
| $H_3BO_3$ | 2.5 |
| Potassium Silicate (Perkasil) | 6.8 |
| Sodium Silicate | 7.5 |
| F 6340 Black Oxide Pigment* | 10 |
| $KNO_3$ | 1.5 |
| 400 Mesh Quartz (Silica) | 50 |
| Water | 50 |

*Available from Ferro Corporation of Cleveland, Ohio.

The slip was milled to a fineness of 0.1 to 0.3 grams being retained on a 325 mesh sieve from a 50 cubic centimeter sample. After milling, the slip had a specific gravity of about 1.64 g/cc. 2.5 grams of 400 mesh silicon carbide particles were added to the slip and blended using a high speed mixer. The slip was applied to the partially air dried enamel ground coat layer formed in Example 1 by spraying at a rate of about 100 to about 155 g/m$^2$. The coated 3003 aluminum alloy cookware blank was dried for about 20 minutes at about 125° F. and then fired in a convection oven at about 1040° F. for about 10 minutes. The fired thickness of the ceramic substrate was about 2.0 mils. The enamel had a micro-rough surface texture that appeared to the naked eye and to the touch to be similar to 800 grit sandpaper.

EXAMPLE 3

A conventional polyamideimide/polytetrafluoroethylene blend fluorocarbon polymer primer coat was applied to the ceramic substrate formed in Example 2 by a conventional wet spraying coating method to a thickness of about 10 $\mu$m. A conventional polytetrafluoroethylene top coat was then applied over the primer layer by the same coating technique to a thickness of about 25 $\mu$m. The cookware blank was then heated in a conventional oven for about 10 minutes at a temperature of about 800° F. to sinter and cure the fluorocarbon polymer coating.

EXAMPLE 4

The inner surface of the cookware blank coated with the nonstick coating according to the invention in accordance with Examples 1–3 was tested for abrasion resistance using a Taber Model 5130 Abraser equipped with a C-17-F abrasive wheel for 2000 cycles bearing a 1000 gram load. Weight loss was measured as being only 0.03%. No aluminum metal was exposed subsequent to the abrasion testing, and the surface of the coated cookware blank retained its original nonstick performance capability notwithstanding the abrasive action of 2000 cycles with the abrasive wheel. For purposes of comparison, a conventional hard anodized nonstick coated cookware blank exhibited a weight loss of 0.13% for the same test, and its nonstick performance was substantially degraded.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A nonstick coating comprising a ceramic substrate disposed on an aluminum surface and a fluorocarbon polymer coating disposed on said ceramic substrate, wherein said ceramic substrate prior to firing comprises:

a first layer comprising an enamel ground coat comprising at least one glass frit comprising a smelted-in bond-promoting oxide; and a second layer comprising a blend of at least one glass frit, non-vitreous inorganic oxide particles, and non-ceramic refractory particles selected from the group consisting of diamond, carbides, borides, nitrides, and mixtures of the foregoing.

2. The nonstick coating according to claim 1 wherein said non-ceramic refractory particles are selected from the group consisting of boron nitride, boron carbide, titanium boride, aluminum boride, silicon carbide, titanium carbide, silicon nitride, zirconium boride, and mixtures of the foregoing.

3. The nonstick coating according to claim 1 wherein said non-vitreous inorganic oxide particles are selected from the group consisting of alumina, $SiO_2$, zirconia, feldspar, wollastonite, and mixtures of the foregoing.

4. The nonstick coating according to claim 1 wherein said smelted-in bond-promoting oxide in said glass frit in said first layer comprises cobalt oxide.

5. The nonstick coating according to claim 1 wherein said fluorocarbon polymer coating disposed on said ceramic substrate comprises:

a primer layer comprising a blend of fluorocarbon polymers and one or more adhesion promoting high temperature binder resins; and at least one fluorocarbon polymer top coats disposed on said primer layer.

6. The nonstick coating according to claim 5 wherein said adhesion promoting high temperature binder resins comprises one or more selected from the group consisting of polyamideimide resins (PAI), polyethersulfone resins (PES) and polyphenylene sulfide resins (PPS).

7. The nonstick coating according to claim 1 wherein said aluminum surface comprises pure aluminum, an alloy of aluminum, or aluminized steel.

8. The nonstick coating according to claim 7 wherein said first layer of said ceramic substrate prior to firing comprises an enamel ground coat comprising at least one glass frit comprising by weight from about 20% to about 50% $SiO_2$, from about 5% to about 30% $Na_2O$, from about 5% to about 30% $TiO_2$, up to about 15% $K_2O$, up to about 15% $V_2O_5$, up to about 5% $Li_2O$, up to about 5% $P_2O_5$, up to about 5% $B_2O_3$, and from about 1% to about 5% of a smelted-in bond-promoting oxide according to the formula $M_xO_y$, where M is a metal selected from the group consisting of Co, Cu, Fe, and Ni, and X and Y are integers.

9. The nonstick coating according to claim 8 wherein said second layer of said ceramic substrate prior to firing comprises at least one glass frit comprising by weight from about 30% to about 45% $SiO_2$, from about 12% to about 30%

$TiO_2$, from about 5% to about 35% Alkali metal oxides, up to about 20% $Bi_2O_3$, up to about 15% $B_2O_3$, up to about 10% Alkaline-Earth metal oxides, up to about 10% $V_2O_5$, up to about 5% $Sb_2O_5$, and up to about 5% $SnO_2$.

10. The nonstick coating according to claim 9 wherein said non-ceramic refractory particles comprise by weight from about 1% to about 20% of the solids portion of said second layer of said ceramic substrate.

11. The nonstick coating according to claim 1 wherein after firing said ceramic substrate has an average surface roughness (Ra) within the range of from about 0.5 $\mu$in to about 5.0 $\mu$in.

12. An article of cookware comprising a base having an aluminum surface, a ceramic substrate disposed on said aluminum surface, and a fluorocarbon polymer coating disposed on said ceramic substrate, wherein said ceramic substrate prior to firing comprises:

a first layer comprising an enamel ground coat comprising at least one glass frit comprising a smelted-in bond-promoting oxide; and a second layer comprising a blend of at least one glass frit, non-vitreous inorganic oxide particles, and non-ceramic refractory particles selected from the group consisting of diamond, carbides, borides, nitrides, and mixtures of the foregoing.

13. The article of cookware as in claim 12 wherein said non-vitreous inorganic oxide particles are selected from the group consisting of alumina, $SiO_2$, zirconia, feldspar, wollastonite, and mixtures of the foregoing.

14. The article of cookware as in claim 12 wherein said smelted in bond-promoting oxide in said glass frit in said first layer comprises cobalt oxide.

15. The article of cookware as in claim 12 wherein said fluorocarbon polymer coating disposed on said ceramic substrate comprises:

a primer layer comprising a blend of fluorocarbon polymers and one or more adhesion promoting high temperature binder resins; and at least one fluorocarbon polymer top coats disposed on said primer layer.

* * * * *